(12) United States Patent
Väänänen

(10) Patent No.: US 7,839,863 B2
(45) Date of Patent: Nov. 23, 2010

(54) METHOD AND EQUIPMENT FOR PERFORMING AGGREGATE-PORTION-SPECIFIC FLOW SHAPING IN PACKET-SWITCHED TELECOMMUNICATIONS

(75) Inventor: Janne Väänänen, Espoo (FI)

(73) Assignee: Tellabs Oy, Espoo (FI)

( * ) Notice: Subject to any disclaimer, the term of this patent is extended or adjusted under 35 U.S.C. 154(b) by 656 days.

(21) Appl. No.: 10/575,710

(22) PCT Filed: Oct. 13, 2004

(86) PCT No.: PCT/FI2004/000611

§ 371 (c)(1),
(2), (4) Date: Apr. 13, 2006

(87) PCT Pub. No.: WO2005/039123

PCT Pub. Date: Apr. 28, 2005

(65) Prior Publication Data

US 2007/0076609 A1    Apr. 5, 2007

(30) Foreign Application Priority Data

Oct. 14, 2003  (FI) .................................. 20031502
Oct. 17, 2003  (FI) .................................. 20031525

(51) Int. Cl.
*H04L 12/28* (2006.01)
*H04L 12/56* (2006.01)

(52) U.S. Cl. ............................ 370/395.4; 370/395.42; 370/412

(58) Field of Classification Search ............. 370/230.1, 370/230, 229, 395.4, 395.42, 412; 709/234, 709/232, 230

See application file for complete search history.

(56) References Cited

U.S. PATENT DOCUMENTS

| 6,532,213 | B1 | 3/2003 | Chiussi et al. |
| 6,549,514 | B1 | 4/2003 | Kilkki et al. |
| 2003/0099200 | A1 | 5/2003 | Kiremidjian et al. |

(Continued)

FOREIGN PATENT DOCUMENTS

CA    2 366 781 A1    7/2002

(Continued)

*Primary Examiner*—Chi H Pham
*Assistant Examiner*—Farah Faroul
(74) *Attorney, Agent, or Firm*—Birch, Stewart, Kolasch and Birch, LLP

(57) ABSTRACT

The invention relates to a method and equipment for performing aggregate-portion-specific flow shaping in packet-switched telecommunications, in such a way that the traffic flows (V1-VL) arriving in the system can be arbitrarily bundled into shaping groups and the speed properties (CIR, PIR, CBS) of an aggregate portion formed of packets representing the arbitrary shaping group (k) can be monitored and limited (aggregate-portion-specific shaping group). The invention is based on the fact that the earliest permitted moment, at which a packet in the system can be forwarded, is defined as the greatest value of the VTS values of all the shaping groups to which the traffic flow represented by the packet belongs, and as a result of the forwarding of the packet, the VTS values of the same shaping groups (k) are updated, in which the VTS value of an individual shaping group (k) expresses the earliest permitted moment, at which a packet belonging under the relevant shaping group (k) can be forwarded, without breaking the restrictions of the speed properties of the shaping group (k) being examined.

4 Claims, 4 Drawing Sheets

U.S. PATENT DOCUMENTS

| | | |
|---|---|---|
| 2003/0165116 A1 | 9/2003 | Fallon et al. |
| 2004/0066743 A1* | 4/2004 | Shimojo et al. ............. 370/229 |
| 2004/0100967 A1* | 5/2004 | Robotham et al. ....... 370/395.4 |
| 2009/0010262 A1* | 1/2009 | Sugai et al. ................. 370/394 |
| 2009/0116489 A1* | 5/2009 | Hanks ......................... 370/394 |

FOREIGN PATENT DOCUMENTS

| | | |
|---|---|---|
| EP | 1 111 851 A2 | 6/2001 |
| EP | 1 124 356 A2 | 8/2001 |
| EP | 1 227 624 A2 | 7/2002 |
| EP | 1 345 365 A2 | 9/2003 |
| WO | WO-02/063837 A1 | 8/2002 |

\* cited by examiner

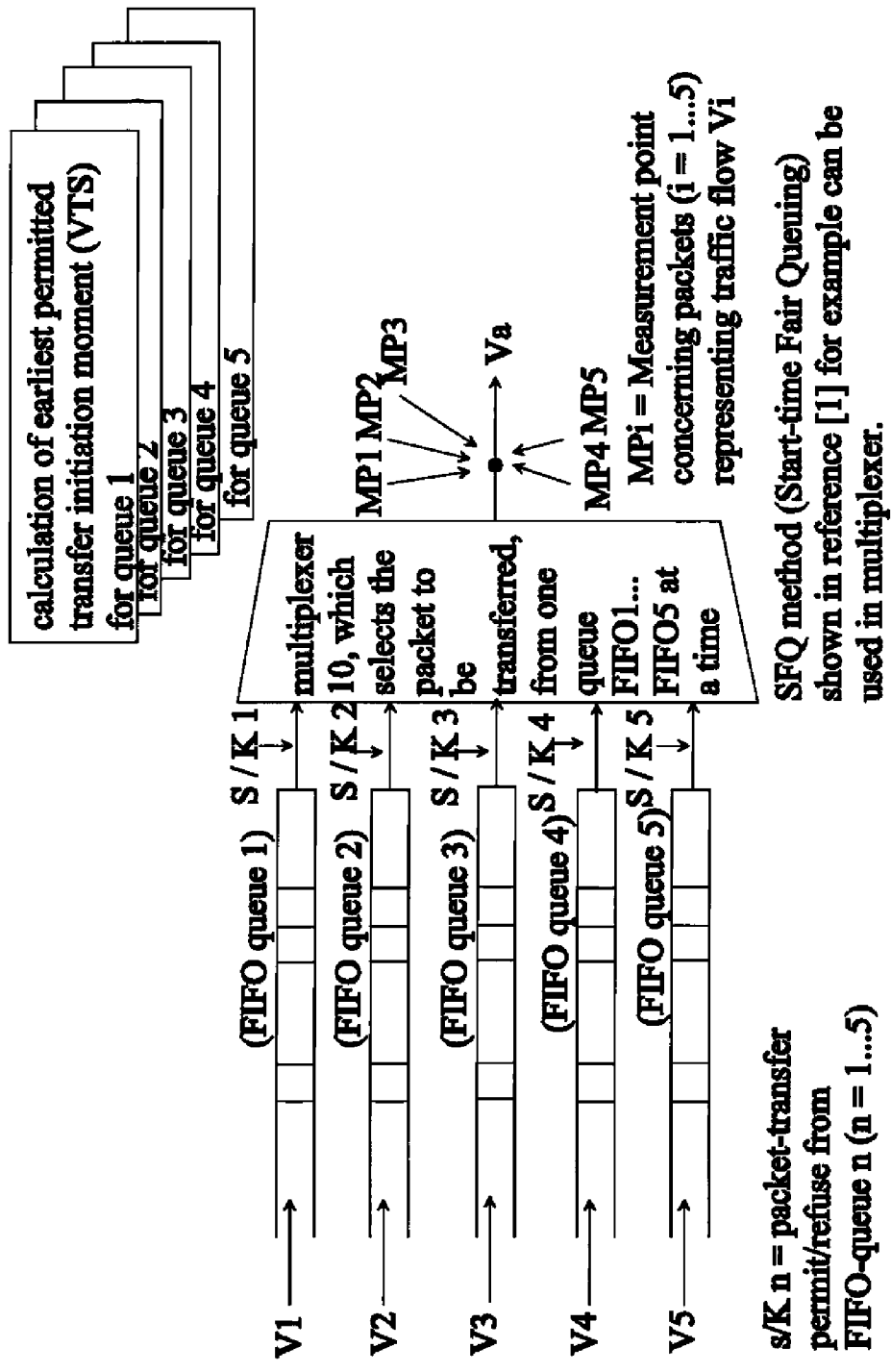
Figure 2, Prior Art

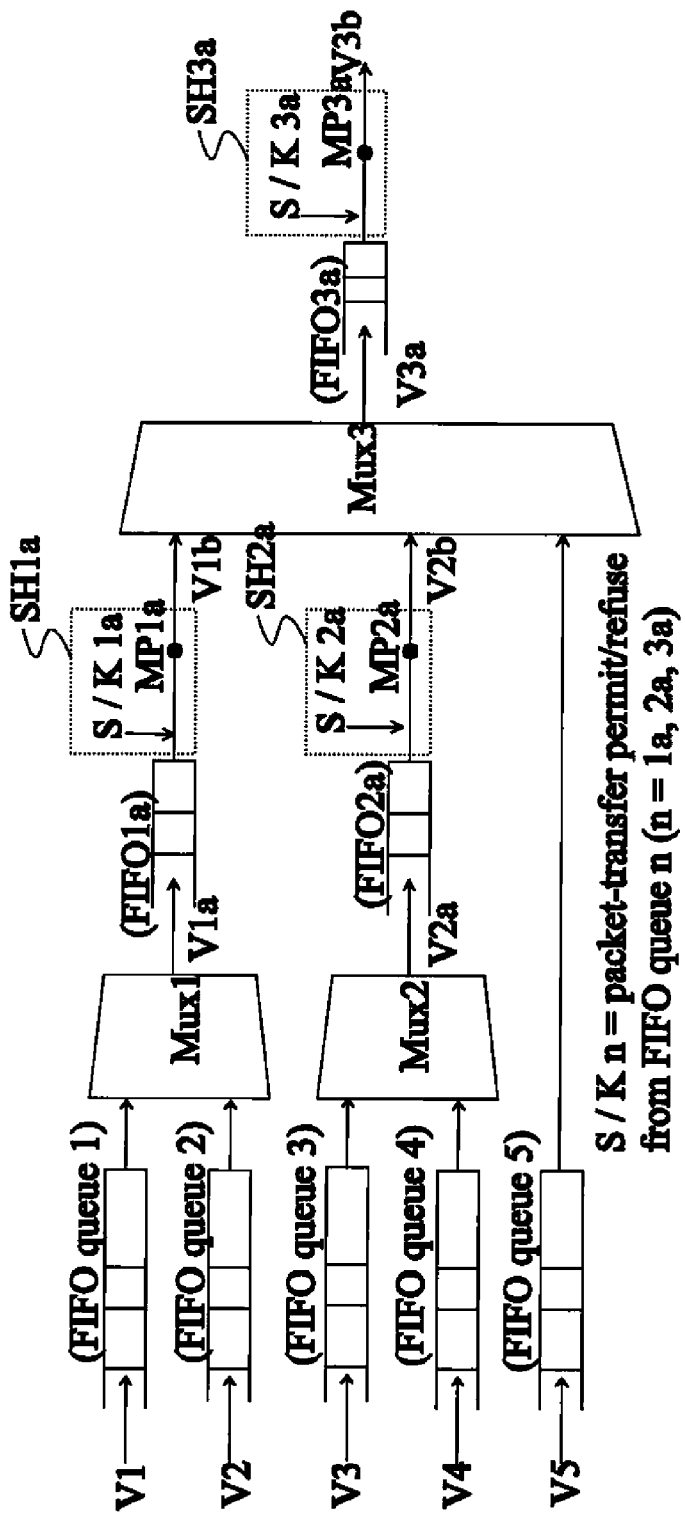
Figure 3, Prior Art

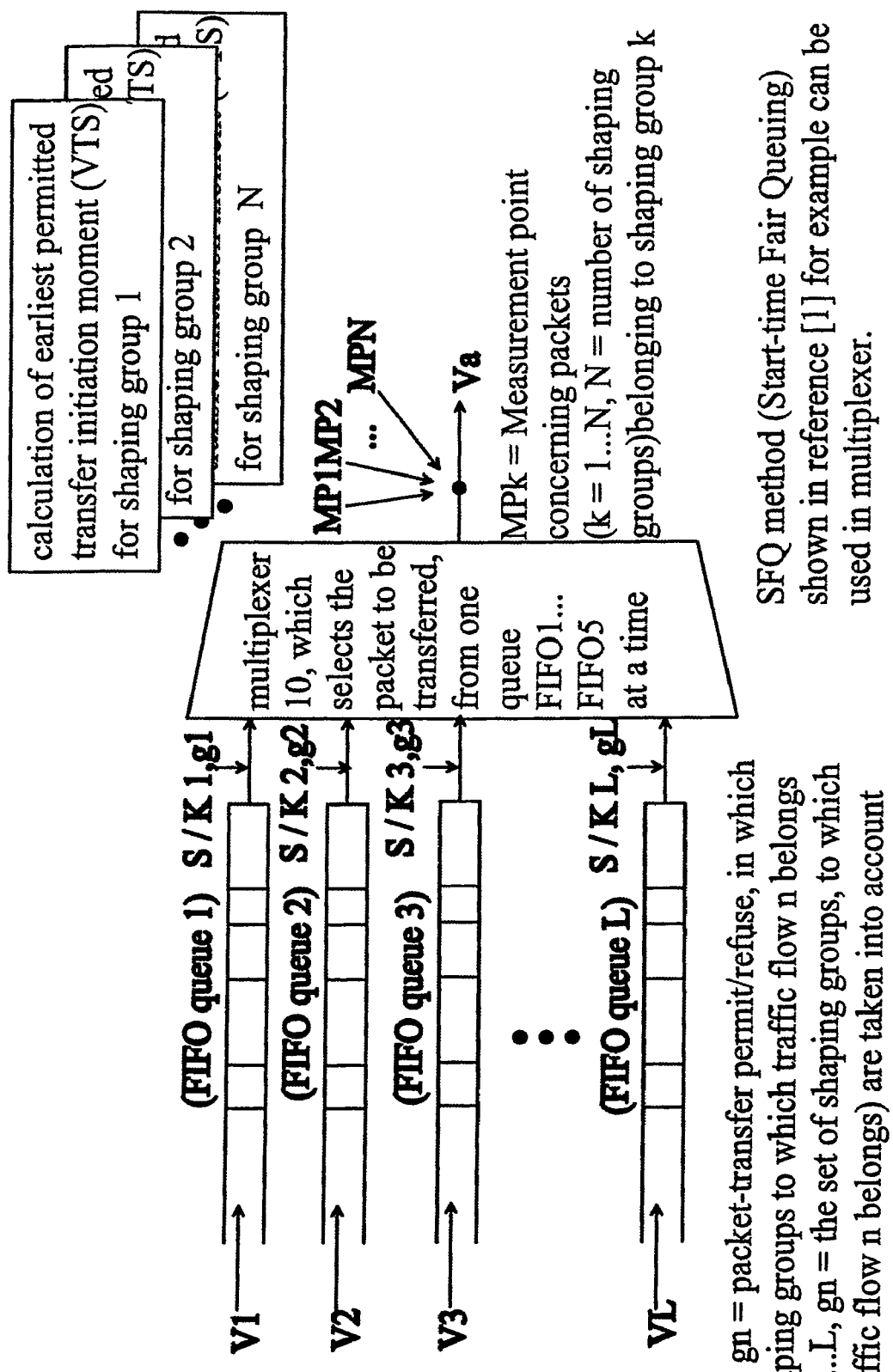

METHOD AND EQUIPMENT FOR PERFORMING AGGREGATE-PORTION-SPECIFIC FLOW SHAPING IN PACKET-SWITCHED TELECOMMUNICATIONS

FIELD OF THE INVENTION

The present invention relates to a method, according to claim 1, for performing aggregate-portion-specific flow shaping in packet-switched telecommunications.

The invention also relates to equipment, according to claim 3, for performing aggregate-portion-specific flow shaping formation in packet-switched telecommunications.

BACKGROUND

In this publication, the following abbreviations are used in the depiction of both the prior art and the invention:

CBS Committed Burst Size (greatest permitted burst size [bit]), when exceeding the committed information flow,
CIR Committed Information Rate (greatest permitted mean traffic speed [bit/s]),
FIFO First In, First Out discipline,
MP Measuring Point, in which the speed characteristics of the traffic flow are measured (e.g., mean traffic speed, momentary traffic speed, bust size),
PIR Peak Information Rate (greatest permitted momentary traffic speed [bit/s]),
PKS Packet size in bits,
V1, V2, . . . . Traffic flow 1, 2, . . . ,
VTS The earliest moment in time, after which the next packet representing a specific traffic flow, or shaping group may be forwarded, in order that not even one rule set for a speed property of the traffic flow or shaping group in question will be broken (Valid Time to Send),
VTSi The earliest moment in time, after which the next packet representing the traffic flow i may be forwarded, in order that not even one rule set for a speed property of the flow in question will be broken,
VTSk The earliest moment in time, after which the next packet representing the shaping group k may be forwarded, in order that not even one rule set for a speed property of the shaping group in question will be broken,
VTS_pk The earliest moment in time, after which a packet may be forwarded, in order that not even one rule set for a speed property dealing with any shaping group associated with the packet will be broken (Valid Time to Send),
VTS_CIR The earliest moment in time, after which the next packet representing a specific traffic flow, or shaping group may be forwarded, in order that the greatest permitted mean speed and/or the greatest permitted burst size will not be exceeded,
VTS_PER The earliest moment in time, after which the next packet representing a specific traffic flow, or shaping group may be forwarded, in order that the greatest permitted momentary speed will not be exceeded.

In packet-switched telecommunications systems, it is often advantageous for it to be possible to monitor and limit the speed properties of the traffic flow formed of packets being transmitted. A speed property can refer, for example, to the mean traffic speed (CIR), the size of the burst (CBS) by which the mean speed can be momentarily exceeded, or the momentary speed (PIR). The traffic flow can consist of, for example, packets to be routed to a specific transfer link, packets sent by a specific end-user, which have a specific source address, or packets to be routed to a specific transfer link, which have a specific service class. In the examinations presented in this publication, an individual traffic flow consists of packets, which are directed to a specific queue, in the order of their entry to the system, FIGS. 1, 2, 3, and 4.

FIG. 1 shows one way, according to the prior art, of monitoring and limiting the speed properties of a traffic flow. In the following examination that further elucidates the matter, the term speed properties is used to include mean speed (CIR [bit/s]), burst size (CBS [bit]), by which the mean speed can be exceeded temporarily, and momentary speed (PIR [bit/s]). When packets are begun to be transferred past the measurement point (MP) marked in FIG. 1 (i.e. when the first bit of the packet being transferred passes the point MP), the values of the variables VTS_CIR and VTS_PIR are calculated for the next packet. VTS_CIR gives the earliest permitted moment in time, when the next packet can be begun to be transferred past MP, in order not to exceed the CIR or the CBS restrictions. Correspondingly, VTS_PIR gives the earliest permitted moment in time, when the next packet can be begun to be transferred past MP, in order not to exceed the PIR restriction. The equations 1 and 2 show the principle generally used for calculating the VST_CIR and the VTS_PIR values.

$$\text{VTS\_CIR}_{next}=\max(t\text{-CBS/CIR},\text{VTS\_CIR}_{prev})+\text{PKS/CIR}, \quad (1)$$

and $$\text{VRS\_PIR}_{next}=\max(t,\text{VTS\_PIR}_{prev})+\text{PKS}_{prev}/\text{PIR}, \quad (2)$$

in which t is the time, PKS is the size of the packet in bits, the sub-index 'next' refers to the next packet and the sub-index 'prev' prefers the packet the first bit of which is transferred past point MP at the moment t.

When all the speed properties are taken into account, the earliest permitted moment (VTS), when the next packet can begin to be transferred past point MP, is obtained from equation 3.

$$\text{VTS}=\max(\text{VTS\_CIR},\text{VTS\_PIR}). \quad (3)$$

In the rest of this publication, a system, by means of which the speed properties of the traffic flow can be monitored and limited, will be referred to as a 'shaper' (SH) while the operation, in which the speed properties of the traffic flow are monitored and limited, will be referred to as 'shaping'. An essential part of shaping is a buffer memory, in which it is possible to store the packets, which, due to speed restrictions, cannot be forwarded (i.e. past point MP) immediately after they have arrived in the system. If it is wished to ensure that shaping does not alter the transfer sequence of the packets, FIFO (first in-first out) queue discipline is applied in the buffer memory, as in FIG. 1.

FIG. 2 shows a system according to the prior art for implementing the shaping of several parallel traffic flows V1, . . . , V5, in a situation, in which the flows in question are alternated (multiplexed) to form a single aggregate flow Va. Multiplexing can take place by applying, for example, the SFQ (Start-time Fair Queuing [1]) method. In the system shown in the figure, the speed properties of a portion formed of packets representing individual traffic flows (V1, . . . , or V5) in an aggregate flow Va can be monitored and limited. Measurement points (MP1, MP5) relating to the multiplexed traffic flows (V1, . . . , V5) are all at the same location in the output of the multiplexer. The measurement point MPi, only monitors packets representing the multiplexed traffic flow Vi (i=1, . . . , 5). Similarly, when calculating the earliest permitted transfer moment VTSi, only packets representing the traffic flow Vi are taken into account. The earliest permitted transfer moment VTSi can be calculated for a multiplexed traffic flow Vi, for example, as shown in equations 1, 2, and 3.

In the following, a situation is examined, in which it is desired to perform shaping aggregate-portion-specifically, for example, to permit the monitoring and limiting of the speed properties of a portion formed of packets representing the traffic flows V1 and V2 in the aggregate flow, the monitoring and limiting of the speed properties of a portion of packets representing the traffic flows V3 and V4 in the aggregate flow, and, in addition, the monitoring and limiting of the speed properties of the entire aggregate flow. In this publication, shaping of this kind is referred to as aggregate-portion-specific shaping. In the rest of the publication, such a situation will be expressed in such a way that traffic flows V1 and V2 belong to a specific shaping group, V3 and V4 belong to a specific second shaping group, and traffic flows V1, V2, V3, V4, and V5 belong to a specific third shaping group. The shaping group including traffic flows V1 and V2 and the shaping group including traffic flows V3 and V4 are included in the shaping group including traffic groups V1, V2, V3, V4, and V5. This means that shaping can be hierarchal.

In the system implemented according to FIG. 2, aggregate-portion-specific shaping is performed, but with the limitation that, when examined in terms of shaping, the aggregate portions always consist of traffic representing only a single incoming traffic flow V1, V2, V3, V4, or V5.

FIG. 3 shows a system according to the prior art for implementing shaping corresponding to the example situation described above. The traffic flows V1 and V2 are multiplexed to form the traffic flow V1a and the shaper SH1a performs shaping resulting in the traffic flow V1b. The traffic flows V2 and V3 are multiplexed to form the traffic flow V2a and the shaper SH2a performs shaping resulting in the traffic flow V2b. The traffic flows V1b, V2b, and V5 are multiplexed to form the traffic flow V3a while the shaper SH3a performs shaping resulting in the traffic flow V3b.

Situations often arise, in which it is wished to ensure system transmittance with a higher privilege for one specific incoming traffic flow (e.g., V1), than for another traffic flow (e.g., V2). In the system according to FIG. 3 when considering the traffic flows V1 and V2, this is traditionally resolved by controlling the multiplexer Mux1, in such a way that a packet can only be transferred to the FIFO1a queue if the queue is empty. Such an operation is referred to by the established term 'back pressure'. This prevents a situation arising, in which the queue FIFO1a could be filled up with packets representing the traffic flow V2, thus forcing the forwarding of packets representing the traffic flow V1, and which arrive later, to wait. Such operations complicate the system shown in FIG. 3.

The following problems relate to the system according to FIG. 3:

Problem 1) Even though the traffic flows V1b and V2b are monitored and limited with regard to the desired speed properties (e.g., CIR, PIR, CBS), the multiplexing with the traffic flow V5, performed in the multiplexer Mux3, results in there being no guarantee that the portions of the traffic flow V3b, formed of packets representing the traffic flows V1b and V2b, will be within the desired limits in terms of their speed properties. In other words, aggregate-portion-specific shaping cannot be performed.

Problem 2) The logical topology of the multiplexing and shaping system depends on how the traffic flows arriving in the system are bundled into different shaping groups. The system shown in FIG. 3 is only responsible for bundling individual examples of the traffic flows into different shaping groups. In other words, the topology is arbitrary. This hampers the implementation of the shaping system. Particularly the circuit implementation (e.g., using an ASIC (Application Specific Integrated Circuit) microcircuit) becomes difficult, while the software implementation is also challenging.

SUMMARY

The present invention is intended to eliminate the defects of the prior art disclosed above and for this purpose create an entirely new type of method and equipment for performing shaping in packet-switched telecommunications. The aim of the invention is a method and system for performing shaping in such a way as to avoid the aforementioned problems relating to the prior art.

The method according to the invention comprises:
transferring digital information as constant or variable-length packets to a buffer memory as at least two separate traffic flows, the traffic flows forming an aggregate flow,
defining at least one shaping group, each shaping group being a portion of the aggregate flow and including at least one of the traffic flows, and at least one of the shaping groups including at least two of the traffic flows,
setting restrictions of speed properties for at least two shaping groups,
defining an earliest permitted moment, at which a packet can be forwarded, as a greatest value of Valid Time to Send-values of the at least two shaping groups, to which a traffic flow represented by the packet to be forwarded belongs, and
as a result of forwarding the packet, updating the Valid Time to Send-values of the same shaping groups to which the forwarded packet belongs, a Valid Time to Send-value of each shaping group expressing an earliest permitted moment, at which a packet belonging under that shaping group can be forwarded without breaking restrictions of speed properties of that shaping group.

The system according to the invention comprises:
means for receiving constant or variable-length packets carrying digital information,
a controller configured to
classify a packet arriving in the equipment as representing one of traffic flows arriving in the system, the traffic flows forming an aggregate flow,
define at least two shaping groups, each shaping group being a portion of the aggregate flow and including at least one of the traffic flows, and at least one of the shaping groups including at least two of the traffic flows, and
set restrictions of speed properties for the at least two shaping groups,
means for forwarding the packets to an outgoing link or links,
the controller being configured to:
define an earliest permitted moment, at which a packet can be forwarded, as a greatest value of Valid Time to Send-values of those at least two shaping groups, to which a traffic flow represented by the packet to be forwarded belongs, and
update, as a response to forwarding the packet, the Valid Time to Send-values of the same shaping groups to which the forwarded packet belongs, a Valid Time to Send-value of each shaping group expressing an earliest permitted moment, at which a packet under that shaping group can be forwarded without breaking restrictions of speed properties of that shaping group.

In the following, the invention is examined in greater detail with the aid of examples according to the accompanying figures.

BRIEF DESCRIPTION OF FIGURES

FIG. 2 shows a block diagram of a system according to the prior art for implementing the monitoring and limiting of the speed properties of several parallel traffic flows V1, ..., V5, in a situation in which the flows in question are alternated (multiplexed) to form a single aggregate flow Va.

FIG. 3 shows a block diagram of a system according to the prior art concerning an example of a situation, in which it is wished to perform shaping, in such a way that it is possible to monitor and limit the speed properties in an aggregate flow of a portion formed of packets representing the traffic flows V1 and V2, it is possible to monitor and limit the speed properties in an aggregate flow of a portion formed on packets representing the traffic flows V3 and V4, and, in addition, it is possible to monitor and limit the speed properties of the aggregate flow V3.

FIG. 4 shows a block diagram of a system according to the invention for performing shaping, in such a way that the traffic flows arriving at the system can belong to shaping groups in an arbitrary manner and the speed properties of the aggregate portion formed of packets representing an arbitrary shaping group can be monitored and limited (aggregate-portion-specific shaping).

Figure 1:
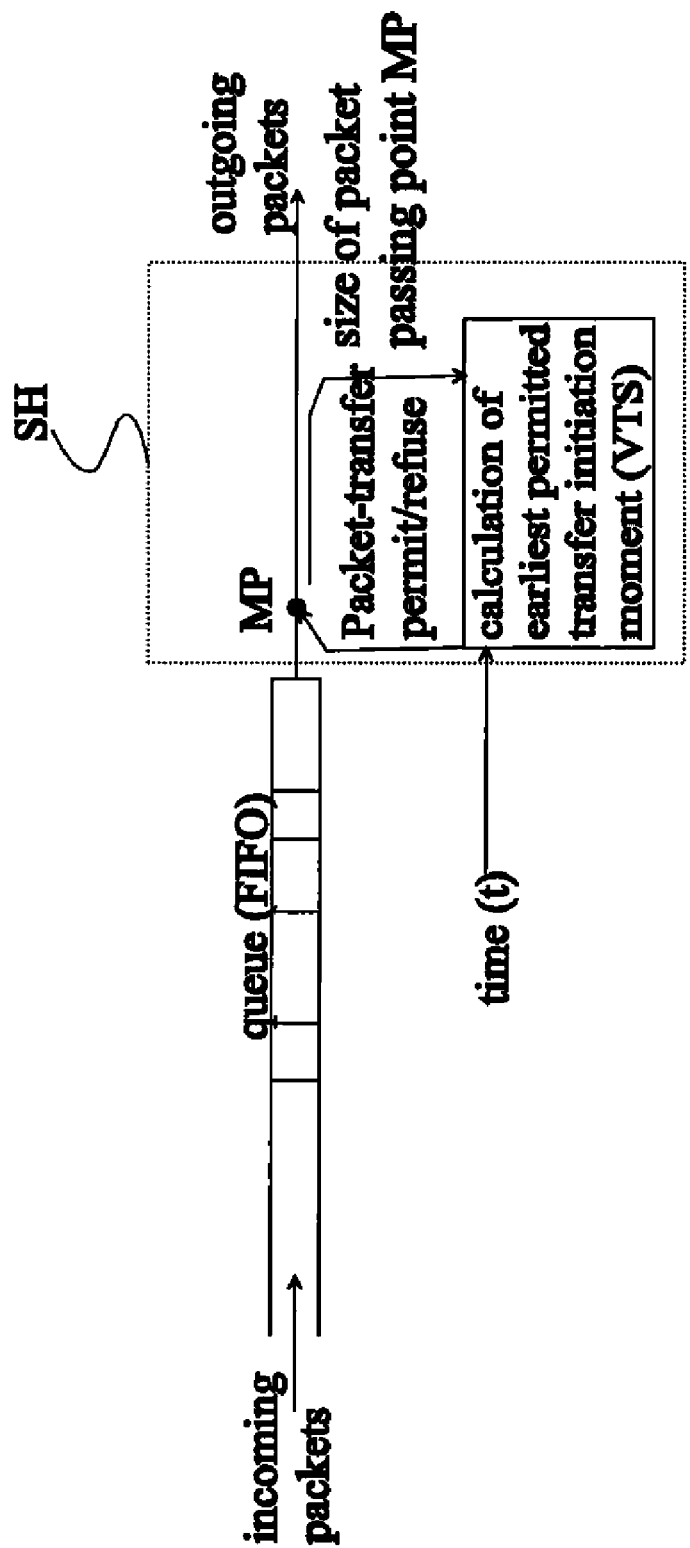
FIG. 1 shows a block diagram of one way according to the prior art of monitoring and limiting the speed properties of a traffic flow.

The theoretical basis of the method according to the invention will become apparent from the following examination.

DETAILED DESCRIPTION OF EMBODIMENTS

Traditionally, shaping is applied to a specific traffic flow, in which the packets move in a temporal sequence, for example, according to FIG. 1, 2, or 3. In the method according to the invention, the central concept is a shaping group, i.e. an aggregate portion. As stated above, the shaping group consists of the incoming traffic flows, the speed properties of the portion of the aggregate flow formed of packets representing which are monitored and limited using a restriction totality of specific speed properties (such as a totality formed of the CIR, PIR, and CBS values). In the method according to the invention, the VTS value is shaping-group-specific. The VTS value of a specific shaping group thus expresses the earliest permitted moment in time, at which a packet representing the relevant shaping group can be forwarded (first bit past the measurement point), in order that a rule set for even one speed property (e.g., CIR) of the relevant shaping {group} will not be broken. The measurement point too is logically shaping-group-specific. In FIG. 4, the measurement points of all the shaping groups k are at the same location. Naturally it is possible to implement shaping equipment, in which the measurement points MP of one or more shaping groups k are located separately. The following examination is restricted to a situation, in which the measurement points MP of all of the shaping groups are at the same location. It is then possible to refer simply to the measurement point, instead of to the measurement point relating to a specific shaping group.

An individual traffic flow can belong to one, several, or no shaping group k. If the traffic flow does not belong to even one shaping group k, the shaping equipment naturally will not set any limit to the speed properties of the traffic flow in question.

The earliest permitted moment, at which a single packet can be forwarded (first bit past the measurement point), is determined on the basis of all the shaping groups k, under which the traffic flow represented by the packet in question belongs. Stated more precisely, $$\text{VTS\_}pk = \max(\text{VTSk, packet belongs under shaping group } k), \quad (4)$$

in which VTS_pk is the earliest moment in time, after which the packet can be forwarded (first bit past the measurement point), in order that not even one rule set for the speed properties associated with any shaping group concerning the packet will be broken, and VTSk is the VTS value of the shaping group k.

In the system according to FIG. 4, the packet being examined is the packet closest to the multiplexer (i.e. at the head of the queue) of some FIFO queue. When the packet is offered to the multiplexer 10, and if the multiplexer 10 selects the packet in question, the packet is then moved immediately past the measurement point. Thus, there is no internal transfer delay in the multiplexer equipment. Thus, VTSpk states the earliest moment in time, at which the packet is permitted to be offered to the multiplexer. For this reason, in FIG. 4, the permit/refuse operations of the transfer of the packet are set between the FIFO queues I-L and the multiplexer 10.

When the packet is begun to be moved past the measurement point, the VTS values of all the shaping groups, under which the packet in question belongs, are updated. If the restrictions of the speed properties of the shaping group are expressed in the form CIR, PIR, CBS, the VTS values can be updated, for example, as shown in equations 1, 2, and 3.

In brief, the principle of the shaping system according to the invention is as follows:

Situation: Packet (first bit) passes measurement point.
Operations: Update all VTS values of the shaping groups, under which the packet in question belongs.
Situation: Determine earliest permitted moment, at which the packet can pass the measurement point.
Operations: Seek maximum of the VTS values of the shaping groups, under which the packet in question belongs.

As can be surprisingly noticed from the above examination, the method according to the invention places no restrictions on how the traffic flows entering the system can be grouped into different shaping groups. By locating the measurement points of all the shaping groups according to FIG. 4, it is possible to monitor and limit the speed properties of an aggregate portion formed on packets representing an arbitrary shaping group.

REFERENCES

[1] Pawan Goyal, Harric M. Vin, Haichen Cheng. *Start-time Fair Queuing: A Scheduling Algorithm for Integrated Services Packet Switching Networks*. Technical Report TR-96-02, Department of Computer Sciences, University of Texas Austin.

What is claimed is:

1. A method for performing aggregate-portion-specific flow shaping in a packet-switched telecommunication system comprising at least one buffer memory and a multiplexer, the method comprising:

transferring digital information as constant or variable-length packets to the at least one buffer memory as at least two separate traffic flows, the traffic flows forming an aggregate flow, defining at least two shaping groups, each shaping group being a portion of the aggregate flow and including at least one of the traffic flows, wherein at least one of the shaping groups includes at least two of the traffic flows, setting restrictions of speed properties for the at least two shaping groups, defining an earliest permitted moment, at which a packet can be forwarded by the multiplexer, as a greatest value of Valid Time to Send-values of the at least two shaping groups to which a traffic flow represented by the packet to be forwarded belongs, and as a result of forwarding the packet, updating the Valid Time to Send-values of the same shaping groups to which the forwarded packet belongs, a Valid Time to Send-value of each shaping group expressing an earliest permitted moment at which a packet belonging to that shaping group can be forwarded without breaking restrictions of speed properties of that shaping group.

2. A method according to claim 1, wherein all traffic flows contained in a first shaping group are also included in a second shaping group.

3. A system for performing aggregate-portion-specific flow shaping in packet-switched telecommunications, the system comprising:

means for receiving constant or variable-length packets carrying digital information;

a controller configured to:

classify a packet arriving in the system as representing one of traffic flows arriving in the system, the traffic flows forming an aggregate flow, define at least two shaping groups, each shaping group being a portion of the aggregate flow and including at least one of the traffic flows, wherein at least one of the shaping groups includes at least two of the traffic flows, and set restrictions of speed properties for the at least two shaping groups; and means for forwarding the packets to an outgoing link or links, wherein the controller is further configured to:

define an earliest permitted moment, at which a packet can be forwarded, as a greatest value of Valid Time to Send-values of the at least two shaping groups, to which a traffic flow represented by the packet to be forwarded belongs, and update, as a response to forwarding the packet, the Valid Time to Send-values of the same shaping groups to which the forwarded packet belongs, a Valid Time to Send-value of each shaping group expressing an earliest permitted moment, at which a packet under that shaping group can be forwarded without breaking restrictions of speed properties of that shaping group.

4. The system according to claim 3, wherein the controller is further configured to define all traffic flows contained in a first shaping group to belong also to a second shaping group.

* * * * *